(12) United States Patent
Kimura et al.

(10) Patent No.: US 6,555,172 B2
(45) Date of Patent: Apr. 29, 2003

(54) METHOD OF BRAZING METAL WORK

(75) Inventors: Nobuhide Kimura, Kariya (JP); Hirokuni Hattori, Nagoya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/939,089

(22) Filed: Aug. 24, 2001

(65) Prior Publication Data

US 2002/0023947 A1 Feb. 28, 2002

(30) Foreign Application Priority Data

Aug. 28, 2000 (JP) .................... 2000-257526

(51) Int. Cl.⁷ ............... B05D 3/02; B23K 1/20
(52) U.S. Cl. ............ 427/318; 427/314; 427/327; 427/385.5; 427/388.1; 228/207; 228/208; 228/214
(58) Field of Search ............ 427/312.2, 299, 427/314, 318, 327, 384, 385.5, 388.1; 228/206, 207, 208, 214

(56) References Cited

U.S. PATENT DOCUMENTS

| | | |
|---|---|---|
| 4,762,674 A | 8/1988 | Cheng et al. |
| 5,424,134 A | 6/1995 | Dudel |
| 5,656,332 A * | 8/1997 | Saito et al. .............. 118/324 |
| 5,755,374 A | 5/1998 | Prigmore |
| 5,772,104 A * | 6/1998 | Paulman .................. 228/175 |

FOREIGN PATENT DOCUMENTS

| | | |
|---|---|---|
| EP | 0 936 024 | 8/1999 |
| JP | 7-185796 | 7/1995 |

* cited by examiner

*Primary Examiner*—Michael Barr
(74) *Attorney, Agent, or Firm*—Harness, Dickey & Pierce, PLC

(57) ABSTRACT

A method of brazing a metal work is disclosed, in which the work is heated to at least the softening temperature of resin and coated with a suspension constituted of a mixture of a flux and a binder, after which the work is brazed by being heated and dried. As a result, the binder (resin) attached to the surface of the work is softened and increases in stickiness. Even if foreign matter becomes attached to the work surface, therefore, the binder causes the flux to be firmly attached to (coupled with) the work surface together with the foreign matter. Thus, the flux can be securely coated (attached) on the work surface. The temperature of the work is not lower than the evaporation temperature of water. Even if oil becomes attached to the work surface, therefore, the water in the suspension is evaporated before it can be repelled by the oil, thus making it possible to prevent the flux from being repelled along with the water. In this way, the flux can be securely coated (attached) on the work surface.

8 Claims, 9 Drawing Sheets

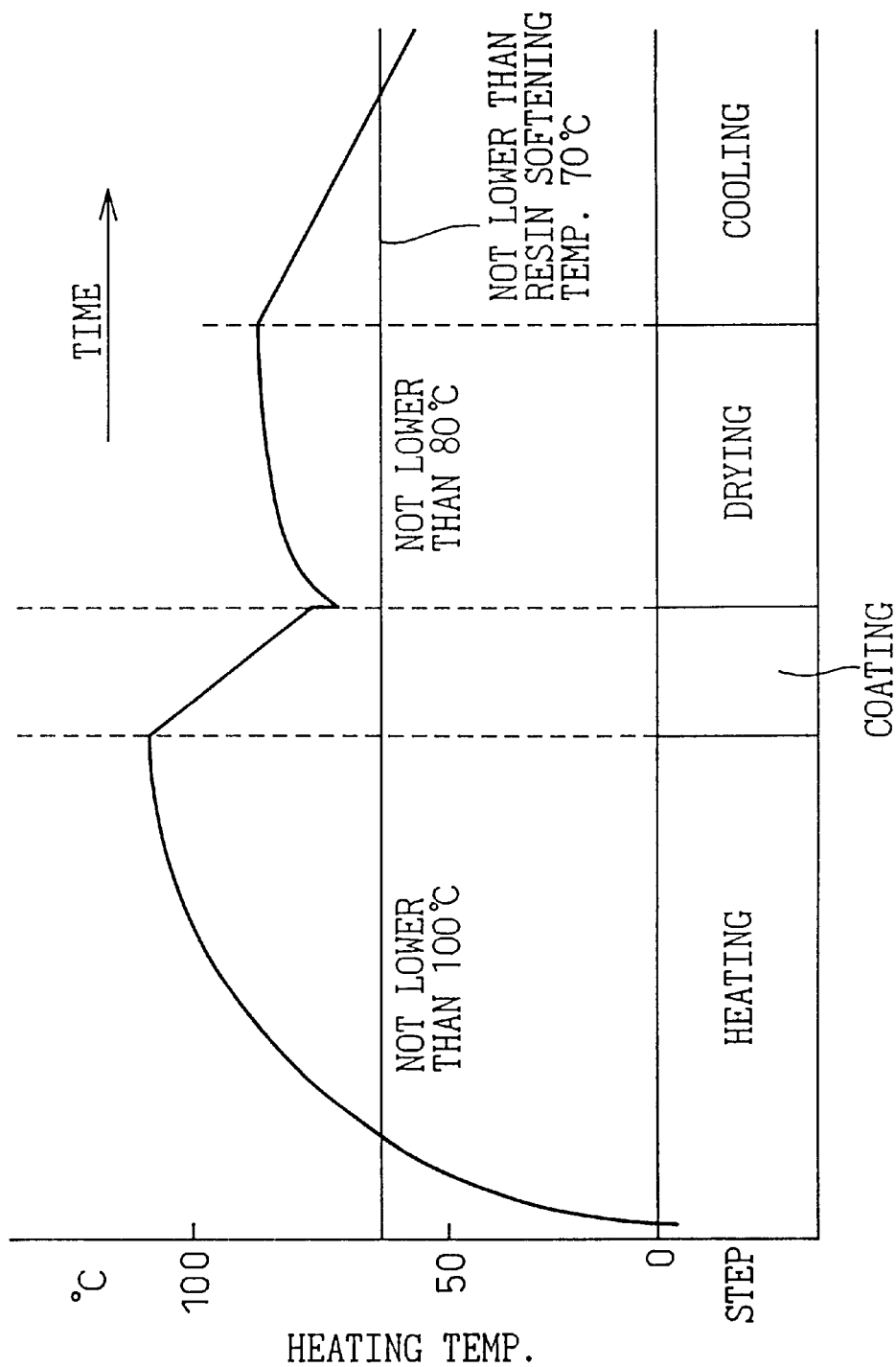

121

121

METHOD OF BRAZING METAL WORK

BACKGROUND OF THE INVENTION

1. Field of the Invention

The present invention relates to a method of brazing a metal work, or in particular to a method of brazing a metal work effectively applicable to a heat exchanger of aluminum such as a radiator.

2. Description of the Related Art

As a method of brazing the heat exchanger, Japanese Unexamined Patent Publication No. 7-185796, for example, discloses an invention in which a work such as cooling fins is immersed in a suspension constituted of a flux and an aqueous solution of a binder formed of resin, the suspension is coated on the work, and the work is dried by being heated to attach the flux securely on the work surface, after which the work is brazed by being heated in a furnace.

In the invention disclosed in the aforementioned patent publication, however, the suspension of the aqueous solution of the binder and the flux is simply coated on the work. In the case where the suspension is coated while foreign matters such as a metal piece or the like are attached to the surface of the work, vibration or rubbing against other works during transportation of the work may separate the foreign matter from the surface of the work before it is dried by being heated, with the probable result that the flux attached to the surface of the foreign matter will come off with the foreign matter.

Also, in the case where oil such as a coolant becomes attached to the surface of the work, the flux is repelled along with the water in the suspension. In actual practice, therefore, the flux substantially cannot be coated on a portion to which oil is attached.

To cope with these problems, foreign matter and oil attached to the surface of the work are desirably removed by washing the work sufficiently. This, however, increases number of steps (time) for washing the work, resulting in an increased number of production steps for the heat exchanger, leading to increased production cost.

SUMMARY OF THE INVENTION

In view of the above problem, the object of present invention is to ensure that the flux is securely coated (attached) on the surface of the work.

In order to achieve the object described above, according to a first aspect of this invention, there is provided a method of brazing a metal work, comprising the steps of heating the metal work to at least the softening temperature of resin, coating a flux mixed with a binder of resin on the work, drying the work coated with the flux, and brazing by heating the work.

As a result, the binder attached to the surface of the work is softened for increased stickiness. Even if foreign matter becomes attached to the surface of the work, therefore, the binder causes the flux, together with the foreign matter, to attach to (couple with) the work surface securely. Thus, the flux can be securely coated (attached to) on the work surface.

As described above, according to this invention, the flux can be coated (attached) securely on the work surface without increasing the number of steps (time) for washing the work, or without the washing process.

According to a second aspect of the invention, there is provided a method of brazing a metal work, comprising the steps of heating the metal work to at least the softening temperature of resin and not lower than water evaporation temperature, coating the work with a suspension constituted of the flux and an aqueous solution of a binder formed of resin, drying by heating the work coated with the flux, drying the work coated with the flux, and brazing by heating the work.

As a result, the binder attached to the work surface is softened and increases in stickiness. Even if foreign matter become attached to the work surface, therefore, the binder causes the flux together with the foreign matter to attach firmly on the work surface. Thus, the flux can be securely coated (attached) on the work surface.

Also, in view of the fact that the temperature of the work is not lower than the evaporation temperature of water, even if oil becomes attached to the work surface, water in the suspension is evaporated before it can be repelled by the oil, and thus the flux is prevented from being repelled together with the water.

As described above, according to this invention, the flux can be coated (attached) securely on the work surface without increasing the number of steps (time) for washing the work, or without the washing process.

According to a third aspect of the invention, there is provided a method of brazing a metal work in which the binder is desirably made of acrylic resin in the case where the work is made of an aluminum alloy.

According to a fourth aspect of the invention, there is provided a method of brazing a metal work in which the binder is desirably made of 3-methoxy-3-methyl-1-butanol in the case where the work is made of an aluminum alloy.

According to a fifth aspect of the invention, there is provided a method of brazing a metal work in which the binder is desirably made of N,N-dimethyl aminoethanol in the case where the work is made of an aluminum alloy.

Incidentally, the above words in parenthesese are indicative of an example of the relation with corresponding specific means described later in embodiments.

BRIEF DESCRIPTION OF THE DRAWINGS

FIG. 3 is a chart showing the relation between the heating temperature and time in a brazing method (method of coating the flux) according to the first embodiment of the invention.

DESCRIPTION OF THE PREFERRED EMBODIMENTS (First embodiment)

The first embodiment is an application of the brazing method according to this invention to the production of an automotive radiator.

Figure 1:
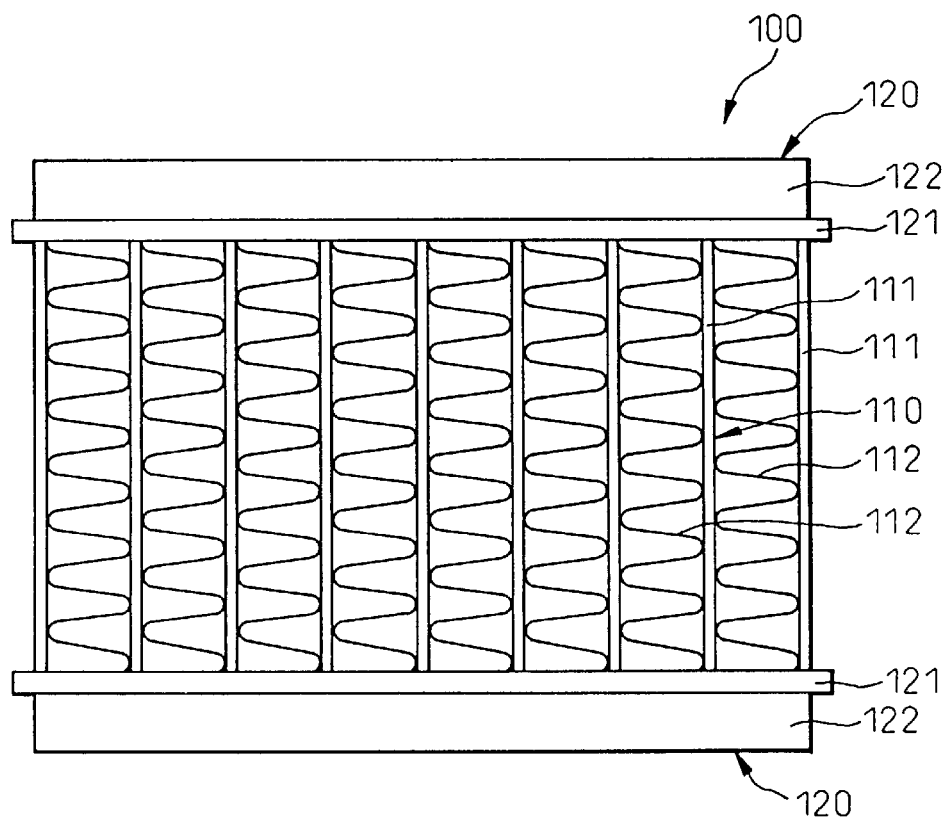
FIG. 1 is a front view of a radiator to which a brazing method according to a first embodiment of the present invention is applied.

A radiator 100 is configured of, as shown in FIG. 1, a core portion 110 including a plurality of tubes 111 for passing the cooling water and a plurality of corrugated fins 112 arranged between the tubes 111 for promoting the heat exchange between the cooling water and the air, and header tanks 120 arranged at the two longitudinal ends of the tubes 111 and communicating with each tube 111.

The header tanks 120 are configured of core plates 121 with the tubes 111 inserted thereinto and a tank body 122 making up an internal tank space with the core plates 121. According to this embodiment, the tubes 111, the fins 112 and the core plates 121 are made of an aluminum alloy while the tank body 122 is made of resin.

The tubes 111, the fins 112 and the core plates 121 are coupled to each other by the brazing method according to this embodiment. The tank body 122 is fixedly caulked to the core plates 121 by plastically deforming a part of the core plates 121.

Figure 2:
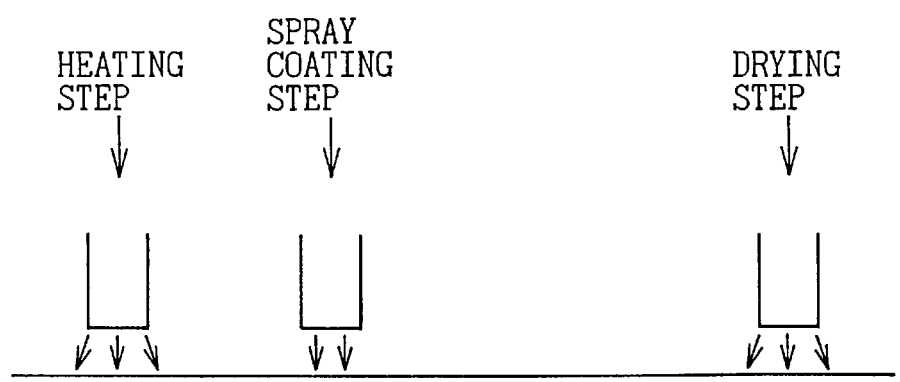
FIG. 2 is a model diagram showing a brazing method (method of coating the flux) according to the first embodiment of the invention.

Now, each step of the brazing method according to this invention will be explained with reference to FIG. 2.

The component parts to be brazed including the tubes 111, the fins 112 and the core plates 121 are hereinafter collectively referred to as a work.

First, the work is heated to a predetermined temperature To or higher by blowing hot air onto the work (heating step). The predetermined temperature To is not lower than the softening temperature (the temperature at which a resin softens and generates stickiness) of a binder (resin material) described later, and at the same time not lower than the evaporation temperature of water (solvent of the binder). According to this embodiment, the predetermined temperature To is set to not lower than 100° C. for the resin softening temperature of about 70° C.

According to this embodiment, the work (the tubes 111, the fins 112 and the core plates 121) is fabricated by pressing a clad member with the surface thereof covered (cladded) by a brazing material. Therefore, the brazing material is already covered on the work surface before the heating step.

As the next step, a suspension constituted of a flux and an aqueous solution of a powdered (granulated) binder formed of resin (acrylic resin in this embodiment) is sprayed (ejected) from a nozzle toward the work thereby to spray-coat the suspension on the work (coating step).

Then, hot air is blown onto the work coated with the suspension thereby to heat and dry the work (drying step). After that, the work is cooled for a predetermined time, and then heated in the furnace to braze it (brazing step). According to this embodiment, the work is dried by being heated to not lower than 80° C.

FIG. 3 shows the change of the work temperature (heating temperature) from the heating step to the cooling step.

Now, the features of this embodiment will be explained.

According to this embodiment, after heating the work to at least the softening temperature of the resin, the suspension mixed with the flux is coated on the work. The binder attached to the work surface, therefore, is softened and increases in stickiness. Thus, even in the case where foreign matter becomes attached to the work surface, the binder causes both the flux and the foreign matter together to attach to (couple with) the work surface firmly, and therefore the flux can be coated (attached) securely on the work surface.

Also, since the work temperature is not lower than the evaporation temperature of water, even if oil becomes attached to the work surface, the water in the suspension is evaporated before it can be repelled by the oil, so that the flux is prevented from being repelled along with the water.

According to this embodiment, therefore, the flux can be coated (attached) securely on the work surface without increasing the number of steps (time) for washing the work, or without the washing process.

Figure 4A:
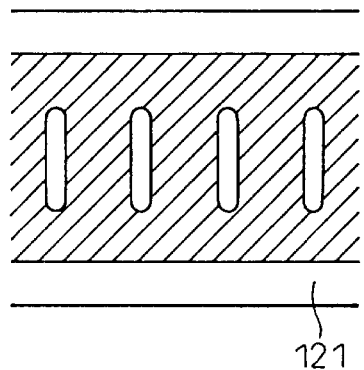
FIGS. 4(a) and 4(b) are model diagrams showing the manner in which the flux is coated (attached).
Figure 4B:
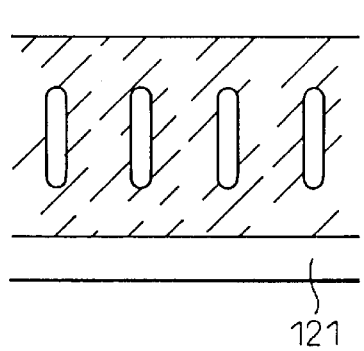

FIG. 4a is a diagram showing the manner in which the flux (hatched portion) is attached by the brazing method (method of coating the flux) according to the present embodiment, and FIG. 4b is another diagram showing the manner in which the flux (hatched portion) is attached by the brazing method (method of coating the flux) according to this embodiment. As is apparent from these diagrams, according to this embodiment, it can be seen that the flux can be securely attached to the work surface.

(Second embodiment)

Figure 5:
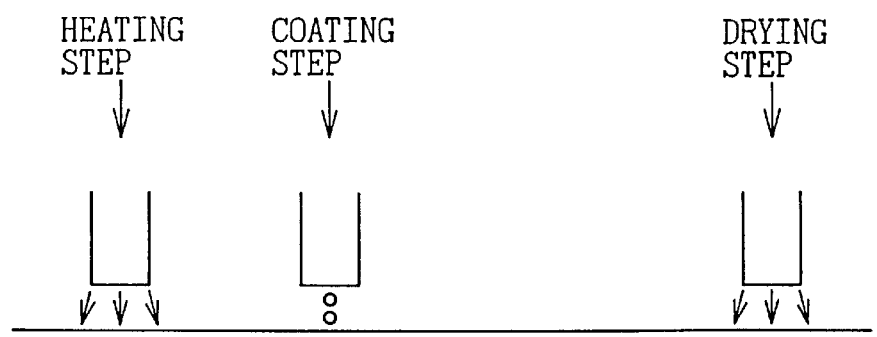
FIG. 5 is a model diagram showing a brazing method (method of coating the flux) according to a second embodiment of the invention.

Unlike in the first embodiment, according to which the suspension is coated by spraying (ejecting) it toward the work from a nozzle, in the present embodiment shown in FIG. 5, the coating step is carried out by a dripping method in which drips of the suspension are released toward the work.

(Third embodiment)

Figure 6:
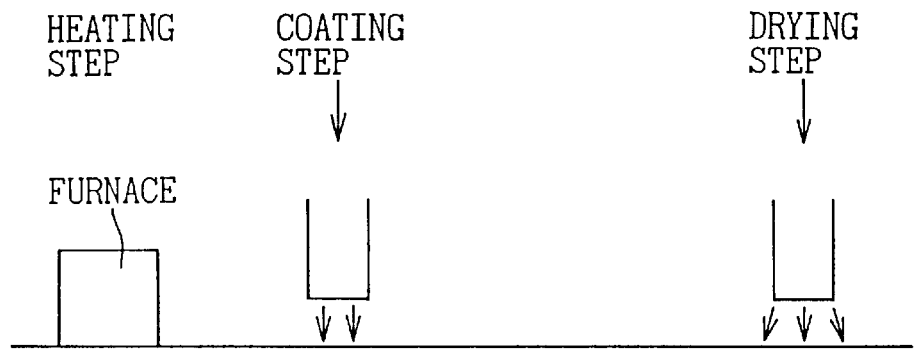
FIG. 6 is a model diagram showing a brazing method (method of coating the flux) according to a third embodiment of the invention.

Unlike the aforementioned embodiments in which the heating step is carried out by blowing hot air to the work (hereinafter referred to as the hot air heating method), in the present embodiment shown in FIG. 6, the heating step is carried out by heating the work in a furnace (hereinafter referred to as the in-furnace heating method), and the coating step is carried out by the spray method.

(Fourth embodiment)

Figure 7:
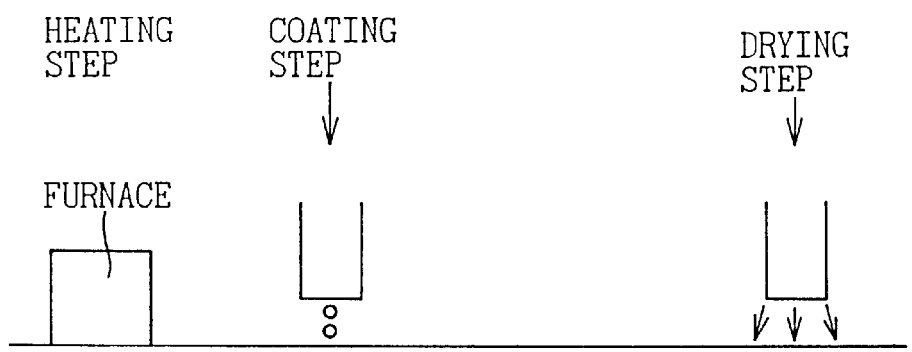
FIG. 7 is a model diagram showing a brazing method (method of coating the flux) according to a fourth embodiment of the invention.

According to this embodiment, as shown in FIG. 7, the heating step is carried out by the in-furnace heating method, and the coating step is carried out by the dripping method.

(Fifth embodiment)

Figure 8:
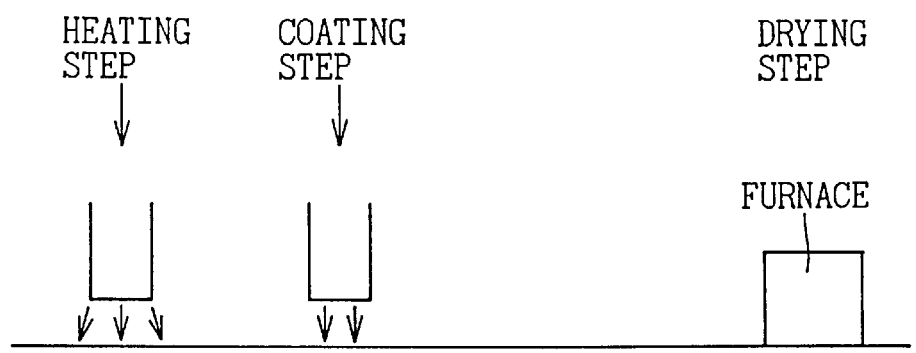
FIG. 8 is a model diagram showing a brazing method (method of coating the flux) according to a fifth embodiment of the invention.

According to this embodiment, as shown in FIG. 8, the heating step is carried out by the hot air heating method, and the coating step is carried out by the spray method. Also, the drying step is carried out by heating the work in the furnace.

(Sixth embodiment)

Figure 9:
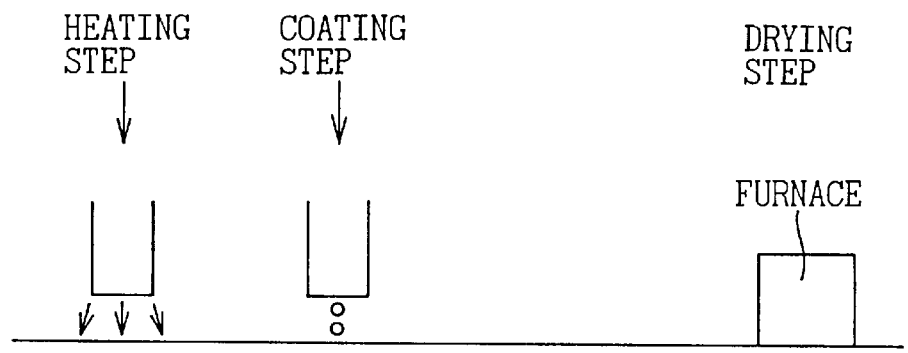
FIG. 9 is a model diagram showing a brazing method (method of the coating flux) according to a sixth embodiment of the invention.

According to this embodiment, as shown in FIG. 9, the heating step is carried out by the hot air heating method, the coating step is carried out by the dripping method, and the drying step is carried out by the in-furnace heating method.

(Seventh embodiment)

Figure 10:
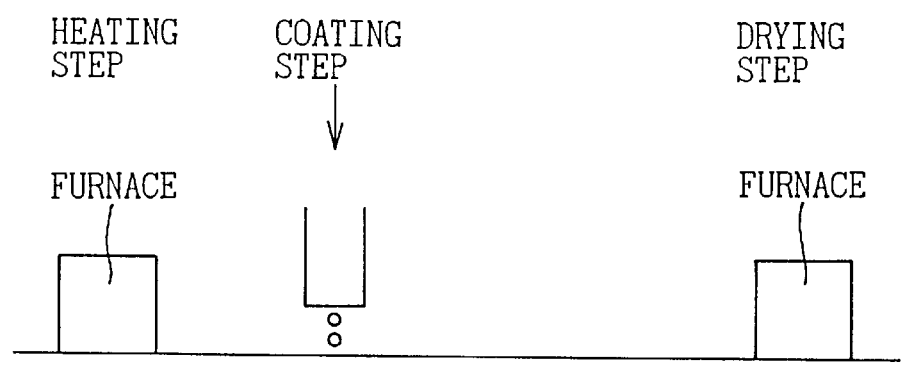
FIG. 10 is a model diagram showing a brazing method (method of coating the flux) according to a seventh embodiment of the invention.

According to this embodiment, as shown in FIG. 10, the heating step is carried out by the in-furnace heating method, the coating step is carried out by the dripping method, and the drying step is carried out by the in-furnace heating method.

(Eighth embodiment)

Figure 11:
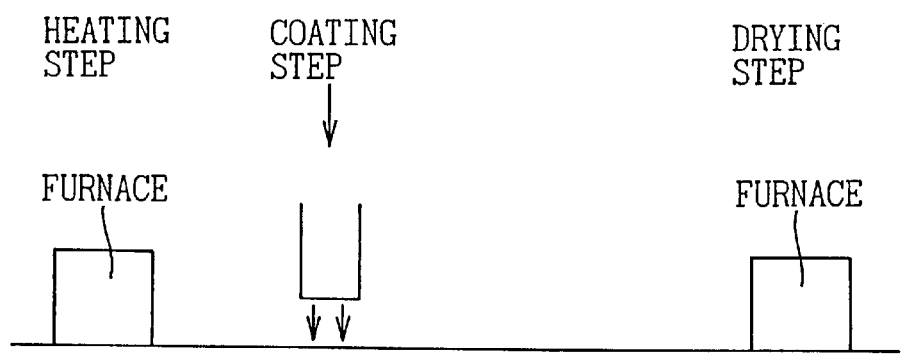
FIG. 11 is a model diagram showing a brazing method (method of coating the flux) according to an eighth embodiment of the invention.

According to this embodiment, as shown in FIG. 11, the heating step is carried out by the hot air heating method, the coating step is carried out by the spray method, and the drying step is carried out by the in-furnace heating method.

(Ninth embodiment)

Figure 12:
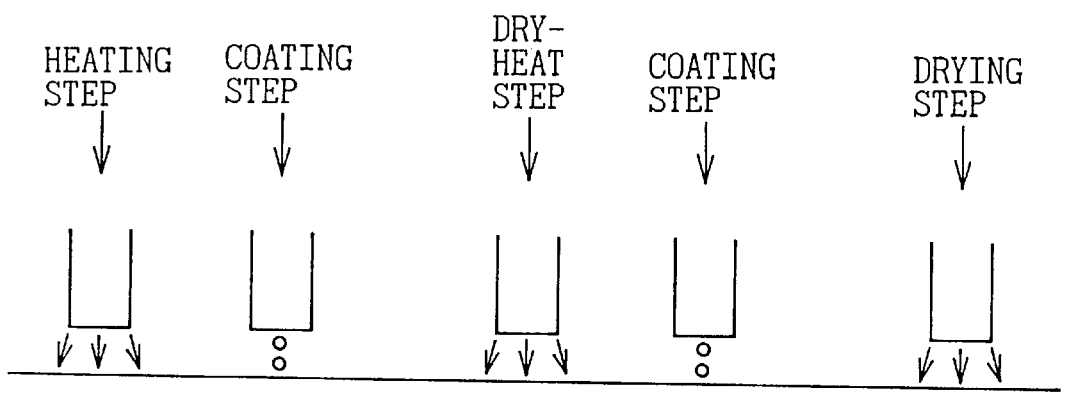
FIG. 12 is a model diagram showing a brazing method (method of coating the flux) according to a ninth embodiment of the invention.

According to this embodiment, as shown in FIG. 12, the heating step, the coating step, the heat-dry step of drying while heating the work, the coating step and the drying step (heating step) are repeatedly carried out in that order. In this way, the coating step is repeated a plurality of times thereby to adjust the amount of flux coated.

In this embodiment, the heating step, the heat-dry step and the drying step are carried out by the hot air heating method, and the coating step is carried out by the dripping method.

(Tenth embodiment)

Figure 13:
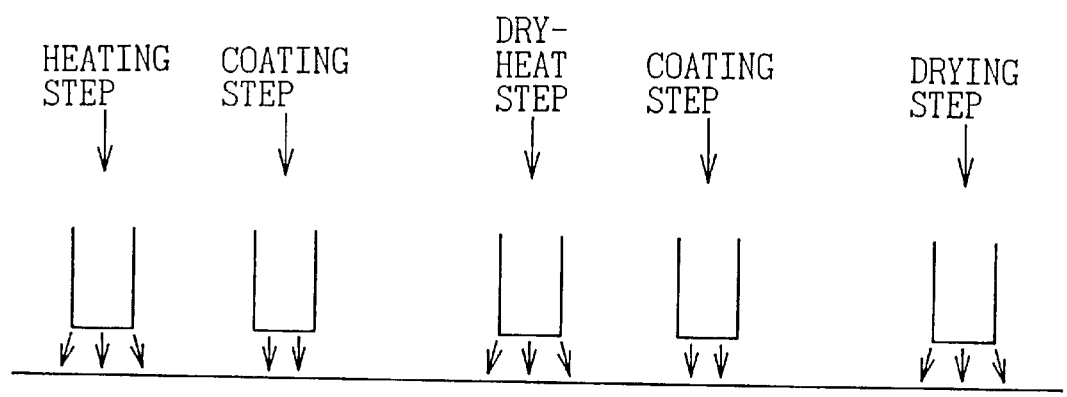
FIG. 13 is a model diagram showing a brazing method (method of coating the flux) according to a tenth embodiment of the invention.

According to this embodiment, like in the ninth embodiment, the coating step is carried out a plurality of times thereby to adjust the amount of flux coated, and as shown in FIG. 13, the coating step is carried out by the spray method.

(11th embodiment)

Figure 14:
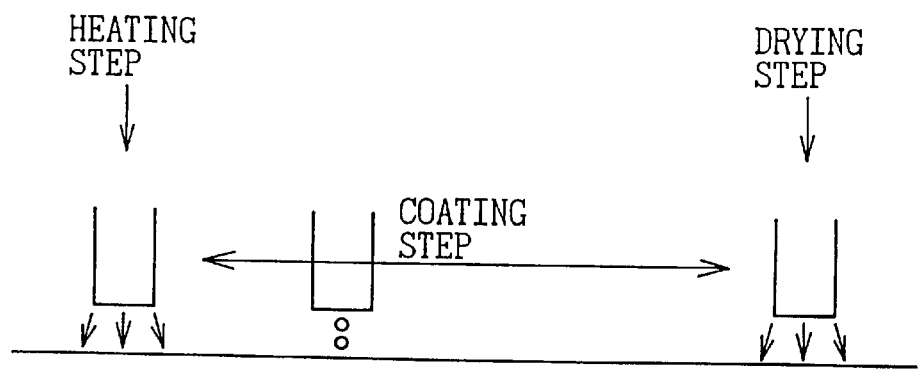
FIG. 14 is a model diagram showing a brazing method (method of coating the flux) according to an 11th embodiment of the invention.

According to this embodiment, as shown in FIG. 14, the amount of flux is adjusted by moving (reciprocating) the nozzle rightward and leftward to release (eject) the suspension in the coating step, and the coating step is carried out by the dripping method.

(12th embodiment)

Figure 15:
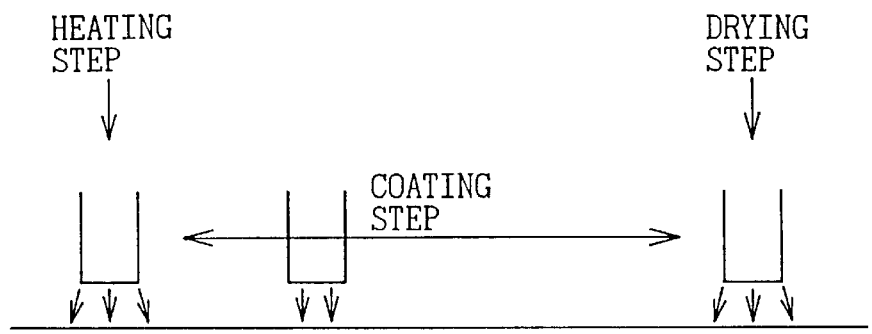
FIG. 15 is a model diagram showing a brazing method (method of coating the flux) according to an 12th embodiment of the invention.

Also according to this embodiment, like in the 11th embodiment, the amount of the flux is adjusted by moving (reciprocating) the nozzle rightward and leftward to release (eject) the suspension in carrying out the coating step. However, as shown in FIG. 15, the coating step is carried out by the spray method.

(13th embodiment)

According to this embodiment, as in the ninth and tenth embodiments, the coating step is carried out a plurality of times thereby to adjust the amount of flux coated. However, as shown in FIGS. 16a and 16b, the coating step is carried out by the spray method and the dripping method combined.

The coating method of spray type can be effectively used for coating the suspension (flux) uniformly over a comparatively wide range, while the drip type coating method is effective for coating the suspension (flux) locally. Taking this into consideration, it is necessary to combine the coating methods of spray type and dripping type appropriately.

Figure 16A:
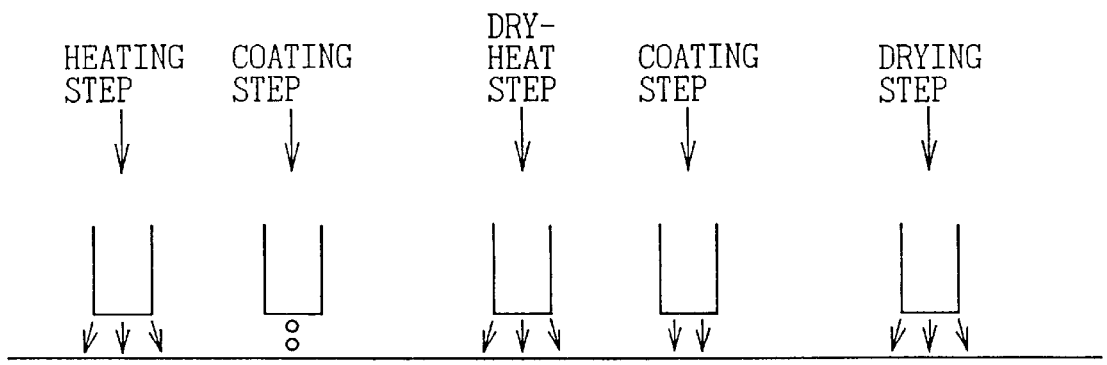
FIGS. 16(a) and 16(b) are model diagrams showing a brazing method (method of coating the flux) according to a 13th embodiment of the invention.
Figure 16B:
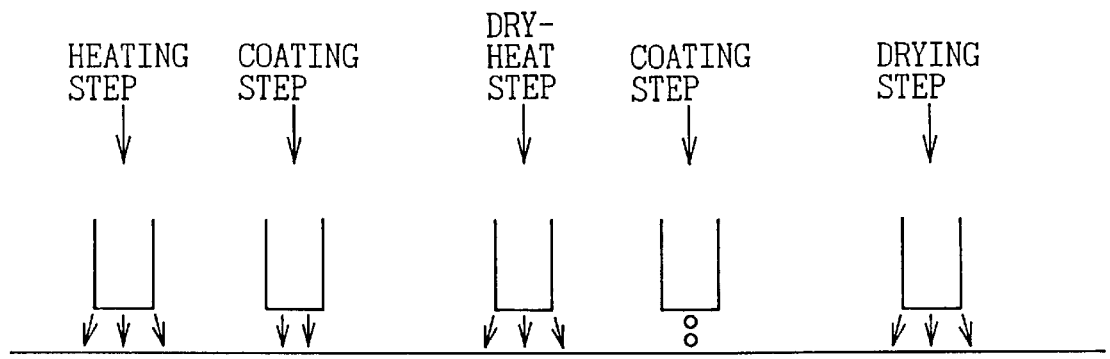

FIG. 16a shows an example in which the drip type coating step is carried out before the spray type coating step. FIG. 16b, on the other hand, shows an example in which the spray type coating step is carried out before the drip type coating step.

(14th embodiment)

Figure 17A:
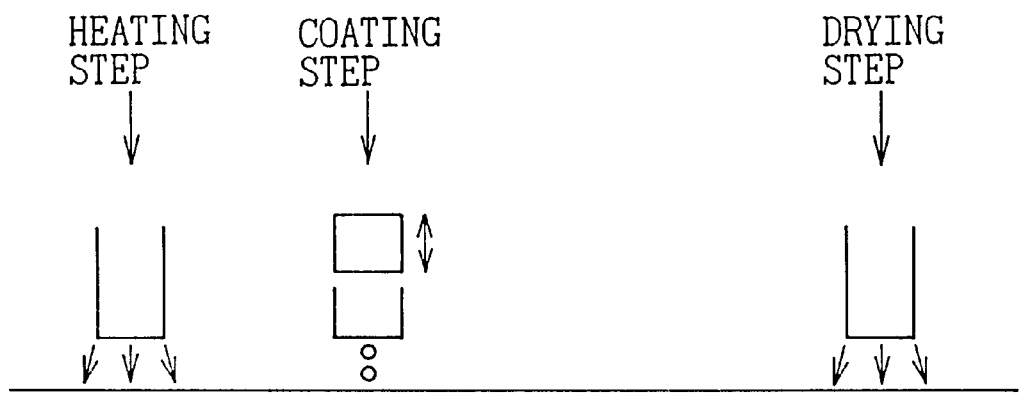
FIGS. 17(a) and 17(b) are model diagrams showing a brazing method (method of coating the flux) according to a 14th embodiment of the invention.
Figure 17B:
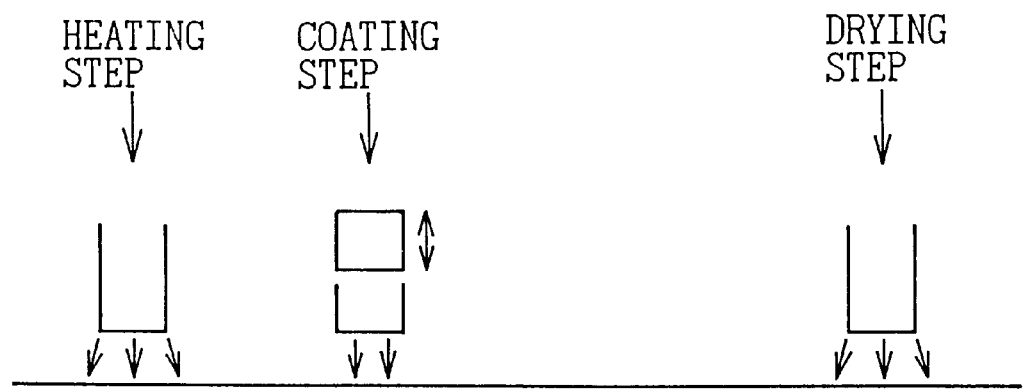

According to this embodiment, as shown in FIGS. 17a and 17b, the amount of flux is adjusted by moving up and down (reciprocating) the nozzle for releasing (ejecting) the suspension during the coating step.

FIG. 17a shows an example in which the coating step is carried out by the dripping method, and FIG. 17b shows an example in which the coating step is carried out by the spray method.

(15th embodiment)

Figure 18A:
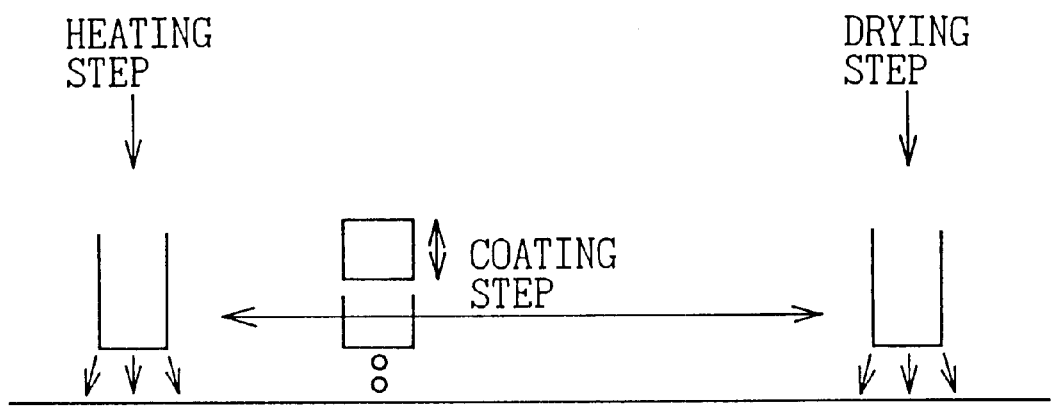
FIGS. 18(a) and 18(b) are model diagrams showing a brazing method (method of coating the flux) according to a 15th embodiment of the invention.
Figure 18B:
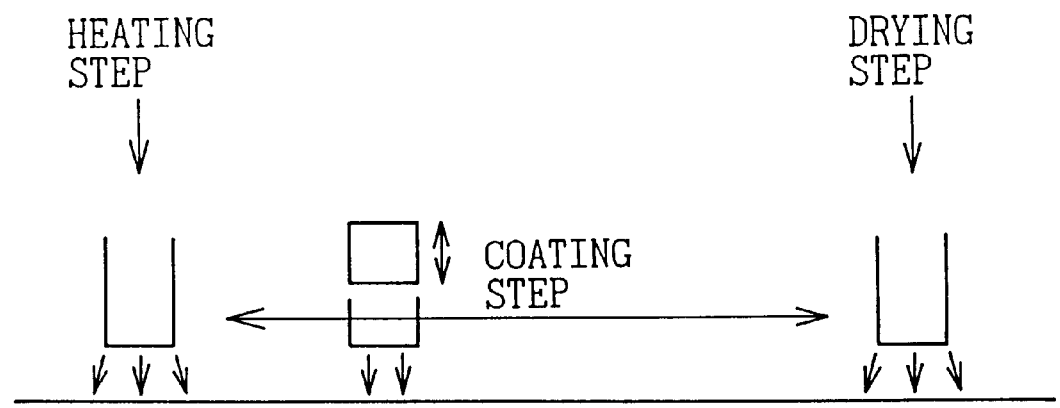

According to this embodiment, as shown in FIGS. 18a and 18b, the 14th embodiment is combined with the 11th and 12th embodiments.

FIG. 18a shows an example in which the coating step is carried out by the dripping method, and FIG. 18b shows an example in which the coating step is carried out by the spray method.

(Other embodiments)

In the embodiments described above, the brazing method according to the present invention is explained by using a radiator as an example. The invention, however, is not confined to a radiator, and is also applicable to other brazed products with equal effect.

Also, instead of the acrylic resin used as a binder in the aforementioned embodiments, a resin such as 3-methoxy-3-methyl-1-butanol or N,N-dimethyl aminoethanol can be used according to this invention.

Further, although the coating step is carried out using a suspension constituted of a mixture of a flux and the aqueous solution of a binder in the above-mentioned embodiments, a suspension constituted of a mixture of a flux and a binder but not the aqueous solution of the binder can alternatively be used in the coating step. In this case, the predetermined temperature To for the heating step is at least the softening temperature of the resin (binder).

What is claimed is:

1. A method of brazing a metal work, comprising the steps of:

heating the metal work to not lower than a softening temperature of a resin and not lower than the evaporation temperature of a solvent;

coating said metal work with a suspension constituted of a mixture of a flux and a solution of a binder formed of said resin;

drying said metal work coated with said flux; and brazing by heating said metal work.

2. A method of brazing a metal work, comprising the steps of:

heating the metal work to not lower than a softening temperature of a resin and not lower than evaporation temperature of water;

coating said metal work with a suspension constituted of a mixture of a flux and an aqueous solution of a binder formed of said resin;

drying said metal work coated with said flux; and brazing by heating said metal work.

3. A method of brazing a metal work according to claim 1, wherein said metal work is formed of an aluminum alloy and said binder is formed of acrylic resin.

4. A method of brazing a metal work according to claim 2, wherein said metal work is formed of an aluminum alloy and said binder is formed of acrylic resin.

5. A method of brazing a metal work according to claim 1, wherein said metal work is formed of an aluminum alloy and said binder is formed of 3-methoxy-3methyl-1-butanol.

6. A method of brazing a metal work according to claim 2, wherein said metal work is formed of an aluminum alloy and said binder is formed of 3-methoxy-3-methyl-1-butanol.

7. A method of brazing a metal work according to claim 1, wherein said metal work is formed of an aluminum alloy and said binder is formed of N, N-dimethyl aminoethanol.

8. A method of brazing a metal work according to claim 2, wherein said metal work is formed of an aluminum alloy and said binder is formed of N, N-dimethyl aminoethanol.

* * * * *